Patented June 24, 1947

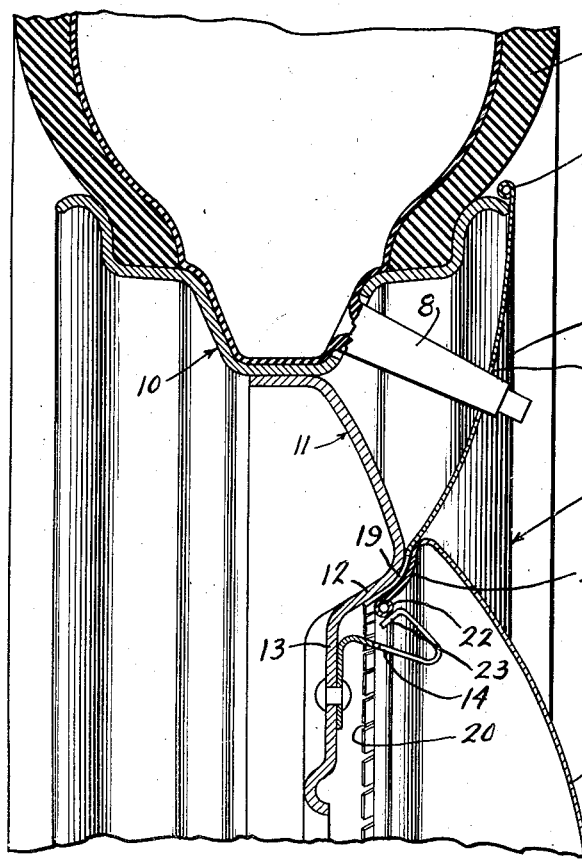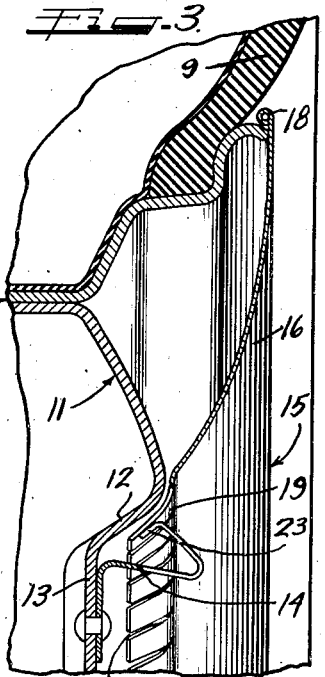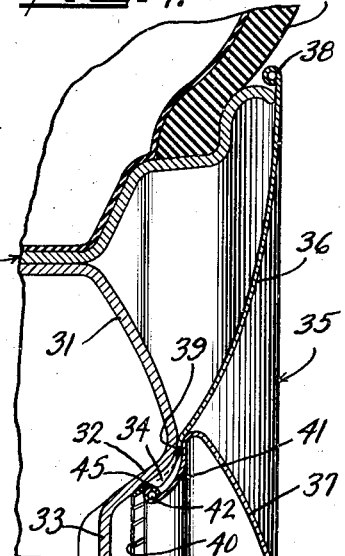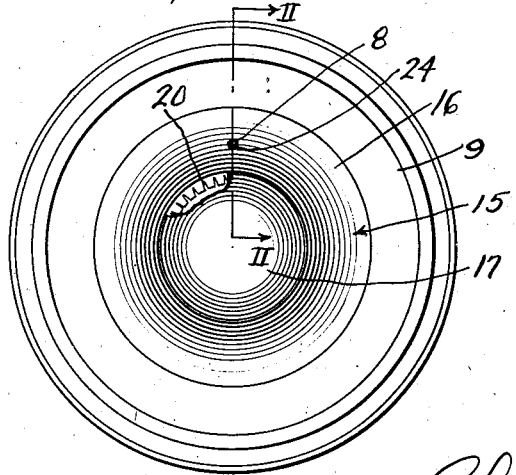

2,422,689

UNITED STATES PATENT OFFICE 2,422,689

WHEEL COVER

George Albert Lyon, Allenhurst, N. J.

Application April 17, 1944, Serial No. 531,335

11 Claims. (Cl. 301—37)

This invention relates to a wheel structure and more particularly to a wheel cover for a wheel.

The present application is a continuation-in-part of the subject matter of my copending application Serial No. 517,324, filed January 7, 1944, and with particular reference to Figures 8 to 11, inclusive, of said copending application.

An object of this invention is to provide a wheel cover which will readily accommodate the allowable manufacturing tolerances in the rim and body parts of a wheel such, for example, as differences in their relative locations after they are assembled together.

In the manufacture of wheel covers and in their assembly on wheels it has been found that considerable tolerance is allowed in the rim and body parts of a wheel. This is particularly true in regard to their relative locations. In other words, for example, the outer edge of the wheel rim may be in one wheel located further axially outward from the body part than in another wheel. As a consequence, a cover which is made to bridge these parts must take this allowable manufacturing tolerance into consideration.

Still another object of this invention is to provide a metallic cover which can bear at its outer margin against the edge of the rim and which has an inner margin so arranged that it will take into consideration slight variations in the relative positions of the body part to the rim and whereby the cover may be tightly held on the wheel irrespective of these variations.

In accordance with the general features of this invention, there is provided in a wheel structure invention including a wheel having a multi-flanged tire rim part and a body part with a depressed central portion, a cover assembly therefor comprising an outer annular member having an outer portion overlying side flanges of the rim part and an inner margin having flexible fingers formed to be stressed into nested engagement with the depressed portion and a central hub cap constructed to be snapped into retained engagement with the depressed portion and having an outer margin overlapping said inner margin and including an under-turned skirt bearing against and deflecting said fingers tightly against the body part whereby the annular member can accommodate allowable manufacturing tolerances in the wheel part.

In accordance with other features of this invention there is provided an article of manufacture comprising a circular wheel cover for covering a portion of a wheel between an outer edge of a tire rim and a wheel body including an outer margin for contact bearing against the rim edge and an inner margin normally arranged so as to be out of contact with the wheel body and being serrated to give it resiliency such that that inner margin can be pressed home into retained engagement with the wheel body so that the cover can accommodate variations in the allowable manufacturing tolerances of the wheel rim and body.

Other objects and features of this invention will more fully appear from the following detailed description taken in connection with the accompanying drawings which illustrate several embodiments thereof and in which:

Figure 1 is a front view of a wheel structure embodying the features of this invention and in which the central hub cap is partly broken away to show the fingers or serrations on the inner margin of the annular cover;

Figure 2 is an enlarged fragmentary cross-sectional view taken on substantially the line II—II of Figure 1 looking in the direction indicated by the arrows and showing my novel cover assembly in retained position on the wheel;

Figure 3 is an enlarged fragmentary cross-sectional view taken through a portion of the wheel with the hub cap omitted and showing the condition of the fingers on the inner margin of the cover prior to the deflection of the same into retained engagement with the wheel body; and Figure 4 is an enlarged fragmentary cross-sectional view similar to Figure 2 illustrating a modification of the invention wherein protuberances on the wheel body are employed for holding the cover on the wheel instead of fingers as in Figure 2.

In the drawings:

In the several modifications of the invention there is illustrated more or less a conventional type of automobile wheel in which a pneumatic tire is held on a so-called drop-center tire rim. In Figure 2 the tire is designated generally by the reference character 9 and it is carried on a conventional multi-flanged, drop-center rim 10 attached in the usual way to a load bearing or wheel body part 11 which has a dished or depressed central portion 12 and a bolt-on flange 13 by means of which the wheel may be attached for support on an axle such as by bolts or cap screws (not shown). Cooperating with this conventional tire and wheel assembly is a cover assembly embodying the features of this invention and designated generally by the reference character 15. This assembly includes an outer annular cover member 16 and a central retaining hub cap 17. Both of these parts may be made of metallic sheet material having some resiliency but preferably formed of such rigidity as to maintain the shape into which these two members of the cover assembly have been initially fabricated.

The annular cover member 16 has an outer turned edge 18 adapted to overlap the outer edge of the tire rim 10 so that the outer margin of this member 16 may tightly bear against the edge of the rim as shown in Figure 2. This annular member 16 has such cross-sectional contour that when it is given a suitable finish such for example as a white finish, it appears to constitute an extension of the tire. In other words, it appears to be a part of the tire. When it is finished white it gives the tire the appearance of having a white side wall in which the white side wall extends clear down to the hub cap 17.

The inner margin of this annular member 16 is curved and turned radially inwardly at 19 for nesting engagement with the depressed portion 12 of the wheel body. Initially this portion 19 is so arranged that it is not actually in contact with the wheel body when the outer margin of the member 16 is bearing against the edge of the rim as shown in Figure 3. This is a very desirable feature of my invention since it eliminates the need for the cover to be tailor made to fit the wheel. In other words, should there be any manufacturing variations in the relative location of the rim and body parts of the wheel the cover can accommodate these since the cover is not initially fitted in tight engagement with spaced points on the wheel. I have found, for example, that the dished body part 11 may extend axially outwardly or inwardly to a different extent relative to the outer edge of the rim without the wheel being unsatisfactory for use. Considerable leeway is allowed in the manufacture of a wheel in this respect. Hence the cover must be able to take care of these allowable manufacturing tolerances.

The turned inner edge 19 of the annular cover member 16 is formed by a suitable press operation and is preferably made more resilient or flexible than the main body of the member 16 by serrating it as indicated at 20. In other words, the inner margin of the cover member 16 in reality comprises a plurality of resiliently deflectible fingers.

As will be perceived from Figure 3, these fingers are adapted to extend into the depressed body portion 12 behind the turned extremities 23 of the hub cap retaining spring fingers 14. These spring fingers, as well known in the art, may be of any suitable number such, for example, as three or four and are suitably fastened to the flange 13 of the wheel body.

In applying the cover 16 to the wheel it is pressed axially against the wheel so that its inner edge rides over the tops of the turned extremities 23 of the spring clips 14. In this operation, the spring clips 14 yield enough to permit of the edge of the member 16 going over the tops of the fingers and to a position wherein the serrated portion 19 will then be disposed between the fingers and the body part 12. This is also an advantageous feature of my invention since it enables the hub cap retaining spring clips 14 to be utilized in initially holding the annular member 16 in position prior to the application of the hub cap 17 to the wheel.

The hub cap 17 has an underturned skirt 21 adapted to nest over the turned portion 19 of the cover member 16 and which skirt 21 terminates in a turned reinforcing edge 22 cooperable with the spring retaining clips.

After the cover member 16 has been applied to the wheel, the hub cap is then positioned over the center of the cover 16 and is pressed axially against the wheel. During this operation the turned edge 23 cams the spring clips 14 radially inwardly to an extent sufficient for the turned edge 22 to pass over the high points or the tops of the turned ends 23 of the clips. After the turned edge of the hub cap has thus been cammed over the clips, it will assume the position shown in Figure 2 in which it is tightly held against the turned margin 19 of the cover member 16. Also in this application of the hub cap, the inner skirt 21 of the hub cap forces or deflects the portion 19 of the annular cover member axially toward the body part of the wheel so that the cover part is held in tight bearing contact against the wheel body part 11. Thus the cover member is held in tight retained engagement with both the rim and the body parts of the wheel.

The hub cap 17 may be easily removed from the wheel when it is desired to get to the wheel fastening bolts at the center of the wheel by simply inserting the end of a screw driver under the outer margin of the hub cap 17 and prying it loose in a manner well known to those familiar with this art. Thereafter, the cover 16 may be pried free of its cooperation with the spring clips by inserting a screw driver under the outer turned edge 18 of the cover member 16.

In Figure 4 I have illustrated a modification of the invention wherein the tire 29 is mounted upon the drop-center rim 30 carried by a wheel body part 31. The wheel body part 31 has a centrally depressed portion 32 terminating in the wheel bolt-on flange 33. This structure of the wheel is substantially identical to that previously described in connection with Figure 2.

The principal difference between this wheel and that of Figure 2 resides in the fact that instead of using spring clips for holding the hub cap on, I employ protuberances 34 formed integral with the depressed portion 32. These protuberances may be pressed from the portion 32 or they may be applied thereto as by means of welded connections and the like. The protuberances are of any suitable number such, for example, as three or four arranged in a common circle on the depressed portion 32.

Cooperable with this wheel is a cover assembly 35 embodying the features of this invention and which includes an outer annular metallic cover member 36 and a central metallic hub cap 37. Both of these parts of the assembly may be made of sheet metal as in the case of the preferred form of the invention.

The outer member 36 has a turned edge 38 for overlapping the outer edge of the rim part 30. Also the outer margin of the member 36 is adapted to tightly bear against the edge of the rim as is clearly shown.

The inner margin 39 of the cover member 36 is formed substantially the same as the inner margin 19 of the first described form of the invention insofar as its initially being out of contact with the wheel body part is concerned. As in the case of the first form of the invention this inner margin 39 is serrated or fingered as indicated at 40. The principal difference between this cover 36 and the cover 16 resides in the fact that the inner margin 39 is provided with a plurality of spaced openings 45 corresponding in number to the number of the protuberances 34 and adapted to register with the protuberances so that the protuberances can extend through the openings or apertures.

In the application of the cover member 36 to the wheel, it is first placed over the wheel with the openings 43 aligned with the protuberances 34. While it is held in this position, the hub cap 37 is pressed over the center of the wheel and into retaining engagement with the protuberances 34. It should be noted that the hub cap 37 has an underturned skirt 41 terminating in a turned edge 42 adapted to be cammed over and into retaining engagement with the protuberances 34, thereby deflecting portion 39 against the wheel body.

The hub cap 37 may be easily removed from the wheel by a suitable pry-off tool in a manner that is well known in the art.

At this time attention is directed to the fact that in both forms of the invention an aperture 24 may be formed in the outer annular cover member (Figure 2) through which the valve stem may extend so as to be accessible without requiring the removal of the cover from the wheel.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a wheel structure including a wheel having a multi-flanged tire rim part and a body part with a depressed central portion, a cover assembly therefor comprising an outer annular member of metallic sheet having an outer margin overlying side flanges of the rim part and an inner portion having flexible fingers formed to be stressed into nested engagement with said depressed portion, and a central hub cap constructed to be snapped into retained engagement with said depressed portion and having an outer margin overlapping said inner margin and including an underturned skirt bearing against and deflecting said fingers tightly against said body part whereby said annular member can accommodate allowable manufacturing tolerances in said wheel parts.

2. In a wheel structure including a wheel having a multi-flanged tire rim part and a body part with a depressed central portion, a cover assembly therefor comprising an outer annular member of metallic sheet having an outer margin overlying side flanges of the rim part and an inner portion having flexible fingers formed to be stressed into nested engagement with said depressed portion, and a central hub cap constructed to be snapped into retained engagement with said depressed portion and having an outer margin overlapping said inner margin and including an underturned skirt bearing against and deflecting said fingers tightly against said body part whereby said annular member can accommodate allowable manufacturing tolerances in said wheel parts, said fingers being integral with said annular member and being provided by serrations in the inner portion of said annular member.

3. In a wheel structure including a wheel having a multi-flanged tire rim part and a body part, a circular wheel cover for covering a portion of the wheel between an outer edge of the tire rim part and the wheel body part including an outer margin for contact bearing against the rim part edge and an inner margin normally arranged so as to be out of contact with the wheel body and being serrated to give it resiliency such that said inner margin can be pressed home into retained engagement with the wheel body part so that the cover can accommodate variations in the allowable manufacturing tolerances of the wheel parts.

4. In a wheel structure including a wheel having a multi-flanged tire rim part and a body part, a circular wheel cover for covering a portion of the wheel between an outer edge of the tire rim part and the wheel body part including an outer margin for contact bearing against the rim part edge and an inner margin normally arranged so as to be out of contact with the wheel body and being serrated to give it resiliency such that said inner margin can be pressed home into retained engagement with the wheel body part so that the cover can accommodate variations in the allowable manufacturing tolerances of the wheel parts, and a central cover retaining member detachably snapped into retained engagement with the wheel body part and having a portion for overlapping the inner margin of the cover to force the same axially inward and tightly against the body part of the wheel.

5. In a wheel structure including a wheel having a multi-flanged tire rim part and a body part with a depressed central portion provided with hub cap retaining means, a cover assembly therefor comprising an outer annular member of resilient sheet having an outer margin overlying side flanges of the rim part and an inner portion having flexible fingers formed to be stressed into nested engagement with said depressed portion, and a central hub cap constructed to be snapped into retained engagement with said depressed portion and having an outer margin overlapping said inner portion and including an underturned skirt bearing against and deflecting said fingers tightly against said body part whereby said annular member can accommodate allowable manufacturing tolerances in said wheel parts, said inner portion of the outer annular member also being provided with a plurality of apertures through which retaining means on the body part of the wheel can extend for retaining cooperation with the hub cap.

6. In combination in a wheel structure including a wheel having a multi-flanged tire rim part and a separately formed and permanently assembled body part with an axially outwardly protruding curved annular nose portion surrounding a depressed central portion provided with a plurality of radially inwardly protruding hub cap retaining protuberances, and wherein the tire rim and body part have unpredictable manufacturing tolerance differences in their relative axial assembled locations as compared with other similar assemblies, a cover assembly therefor comprising an outer annular member of flexible sheet material and convexly curved cross section having its outer margin disposed to concealingly overlie the outer side of the tire rim part and curved radially and axially inwardly toward the body part to a point radially outwardly of said depressed central portion at said nose portion, an inner marginal portion flexibly disposed on said cover member and formed for nested engagement with said nose portion and to enter in said depressed portion, said inner marginal portion of the cover member having a plurality of apertures through which the protuberances can extend, and a central hub cap constructed to be snapped into retained engagement with said protuberances in said depressed portion and having an inner margin overlapping said inner marginal portion of the annular cover member and including an underturned skirt to bear against said inner marginal portion and press the latter against said nose portion of the body part, said inner marginal portion being initially so arranged that it is actually out of contact with said nose portion when the outer margin of the cover member is in contact with the edge of the tire rim part and being deflected by the hub cap skirt into snug retained engagement with said nose portion of the wheel body part.

7. In a cover structure for a wheel including a tire rim part and a body part having a dished central hub cap receiving portion and retaining means, a wheel cover cooperable with an outer side of said wheel and comprising an annulus having an inner margin turned generally axially rearwardly for telescoping cooperation with said dished body portion, and a hub cap held in said wheel by said retaining means, said margin being serrated and resiliently deflectable by the portion of the hub cap engaged thereby to self-adjust itself to variations in size of the hub cap.

8. In a cover structure for a wheel including a tire rim part and a body part having a dished central hub cap receiving portion and retaining means, a wheel cover cooperable with an outer side of said wheel and comprising an annulus having an inner margin turned generally axially rearwardly for telescoping cooperation with said dished body portion, said margin being provided with a plurality of slots and also being formed to nestingly receive and flex to the contour of a hub cap skirt whereby said margin will accommodate within a limited range different size hub cap skirts.

9. In a cover structure for a wheel including a tire rim part and a body part having a dished central hub cap receiving portion and retaining means, a wheel cover cooperable with an outer side of said wheel and comprising an annulus having an inner margin turned generally axially rearwardly for telescoping cooperation with said dished body portion, and a hub cap held in said wheel by said retaining means, said margin being serrated and resiliently deflectable by the portion of the hub cap engaged thereby to self-adjust itself to variations in size of said hub cap portion, said cover also including an outer annular portion extending generally radially inwardly and axially rearwardly from an outer edge of the rim part to a point of bearing on the body part and being of such configuration as to appear in use to be a continuation of the side wall of the tire such that the tire appears to extend to substantially clear down to the hub cap on the wheel.

10. In a cover structure for a wheel including tire rim and body parts having a central detachable hub cap, a metallic wheel cover cooperable with an outer side of said wheel and comprising an annulus having an inner curved margin slotted so as to be flexible, said margin being of such curvature as to conform to and be embraced by an outer margin of the hub cap and said margin being resiliently flexible in response to clamping pressure thereon by the hub cap whereby said cover can within a limited range accommodate different sized hub margins.

11. In a cover structure for a wheel including tire rim and body parts having a central detachable hub cap, a metallic wheel cover cooperable with an outer side of said wheel and comprising an annulus having an inner curved margin slotted so as to be flexible, said margin being of such curvature as to conform to and be embraced by an outer margin of the hub cap and said margin being resiliently flexible in response to clamping pressure thereon by the hub cap whereby said cover can, within a limited range, accommodate different sized hub cap margins, said cover also including an outer annular portion of curved convex cross-section and extending radially and axially inwardly from the outer edge of the rim part to a point directly over the body part.

GEORGE ALBERT LYON.

REFERENCES CITED

The following references are of record in the file of this patent:

UNITED STATES PATENTS

| Number | Name | Date |
|---|---|---|
| 2,279,330 | Lyon | Apr. 14, 1942 |
| 2,244,014 | Lyon | June 3, 1941 |

FOREIGN PATENTS

| Number | Country | Date |
|---|---|---|
| 264,397 | Italy | Apr. 26, 1929 |